(12) United States Patent
Hino

(10) Patent No.: US 10,173,713 B2
(45) Date of Patent: Jan. 8, 2019

(54) STEERING WHEEL DECORATIVE MEMBER

(71) Applicant: KABUSHIKI KAISHA TOKAI RIKA DENKI SEISAKUSHO, Aichi (JP)

(72) Inventor: Taichi Hino, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/644,250

(22) Filed: Jul. 7, 2017

(65) Prior Publication Data

US 2018/0015941 A1    Jan. 18, 2018

(30) Foreign Application Priority Data

Jul. 15, 2016   (JP) .................................. 2016-139923

(51) Int. Cl.
B62D 1/06     (2006.01)

(52) U.S. Cl.
CPC ...................................... B62D 1/06 (2013.01)

(58) Field of Classification Search
CPC ..... B62D 1/06; B62D 1/04; B29L 2031/3047; B60R 21/203
USPC .......................... 74/558, 558.5, 552; 29/894.1
See application file for complete search history.

(56) References Cited

U.S. PATENT DOCUMENTS

| 6,622,591 | B2 * | 9/2003 | Albayrak | B62D 1/06 74/552 |
| 6,637,289 | B2 * | 10/2003 | Kreuzer | B62D 1/06 74/552 |
| 6,684,733 | B2 * | 2/2004 | Faigenblat | B29C 41/20 74/558 |
| 2012/0006148 | A1 * | 1/2012 | Nagata | B60R 16/0215 74/558 |
| 2016/0090116 | A1 * | 3/2016 | Joh | B62D 1/06 74/558 |
| 2018/0009462 | A1 * | 1/2018 | Yamamoto | B62D 1/06 |
| 2018/0043920 | A1 * | 2/2018 | Fujii | B62D 1/065 |

FOREIGN PATENT DOCUMENTS

JP       2000-225951 A       8/2000

* cited by examiner

*Primary Examiner* — David H Bollinger
(74) *Attorney, Agent, or Firm* — Roberts Mlotkowski Safran Cole & Calderon, P.C.

(57) ABSTRACT

A steering wheel decorative member is used for being attached to a resin member covering a periphery of a ring core of a steering wheel. The decorative member includes a hollowed-out portion including an opening that is formed on a surface of the decorative member facing the resin member and that extends in a longitudinal direction of the decorative member.

8 Claims, 3 Drawing Sheets

STEERING WHEEL DECORATIVE MEMBER

The present application is based on Japanese patent application No. 2016-139923 filed on Jul. 15, 2017, the entire contents of which are incorporated herein by reference.

BACKGROUND OF THE INVENTION

Technical Field

The present invention relates to a steering wheel decorative member that improves aesthetics of a front surface of a steering wheel, and particularly relates to a steering wheel decorative member mounted on a ring portion.

Background Art

Examples of a steering wheel offering an improved outward appearance of the steering wheel include a steering wheel previously proposed by the present applicant (see Patent Document 1, for example).

The steering wheel disclosed in the above-described Patent Document 1 includes a resin member made of urethane that covers the periphery of a ring core, a cover skin made of leather that covers the urethane resin member, and a wooden decorative material that partially covers the leather cover skin along a longitudinal direction of the ring core.

CITATION LIST

Patent Literature

Patent Document 1: Japanese Unexamined Patent Application Publication No. 2000-225951A

SUMMARY OF INVENTION

Technical Problem

A steering wheel is configured so as to absorb and alleviate an impact received by a driver at a time of an automobile collision or the like by being deformed, for example. To improve the impact absorbing performance of the steering wheel, the steering wheel is preferably configured so as to be deformed by a large amount.

Meanwhile, when an impact load acts on a steering wheel using a wooden decorative material, the wooden decorative material is also preferably caused to be deformed. However, when a strain amount applied to the wooden decorative material as a result of the deformation of the wooden decorative material exceeds a limit strain amount, cracks occur in the wooden decorative material. Thus, a problem arises with regard to how to obtain a configuration that inhibits the cracks from occurring in the wooden decorative material.

An object of the present invention is to provide a steering wheel decorative member capable of inhibiting cracks from occurring in the decorative member when an impact load acts on a steering wheel.

Solution to Problem

The present invention provides a steering wheel decorative member, which is used for being attached to a resin member covering a periphery of a ring core of a steering wheel, comprising a hollowed-out portion comprising an opening that is formed on a surface of the decorative member facing the resin member and that extends in a longitudinal direction of the decorative member.

In the steering wheel decorative member, the hollowed-out portion may comprise a groove formed in communication with the opening, and wherein at least part of the groove may be filled with a softer material than the decorative member.

In the steering wheel decorative member, the soft material may comprise an adhesive that bonds the decorative member to the resin member.

In the steering wheel decorative member, the hollowed-out portion may comprise a curved surface shape having an arc-shape in cross section.

In the steering wheel decorative member, the decorative member may comprise a wood material.

In the steering wheel decorative member, the hollowed-out portion may comprise a plurality of hollowed-out portions at a position symmetrical with respect to a center axis along the longitudinal direction of the decorative member.

In the steering wheel decorative member, the hollowed-out portion may comprise a cross section with no stress concentrated in a direction orthogonal to the longitudinal direction of the decorative member.

In the steering wheel decorative member, the hollowed-out portion may comprise a groove formed in communication with the opening, and the groove may be unfilled with any materials.

Advantageous Effects of Invention

According to the present invention, when an impact load acts on a steering wheel, a decorative member can be caused to follow a deformation of the steering wheel, and cracks in the decorative member can thus be prevented.

DESCRIPTION OF EMBODIMENT

A preferred embodiment of the present invention will be described in detail hereinafter with reference to the appended drawings.

Configuration of Steering Wheel

Figure 1:
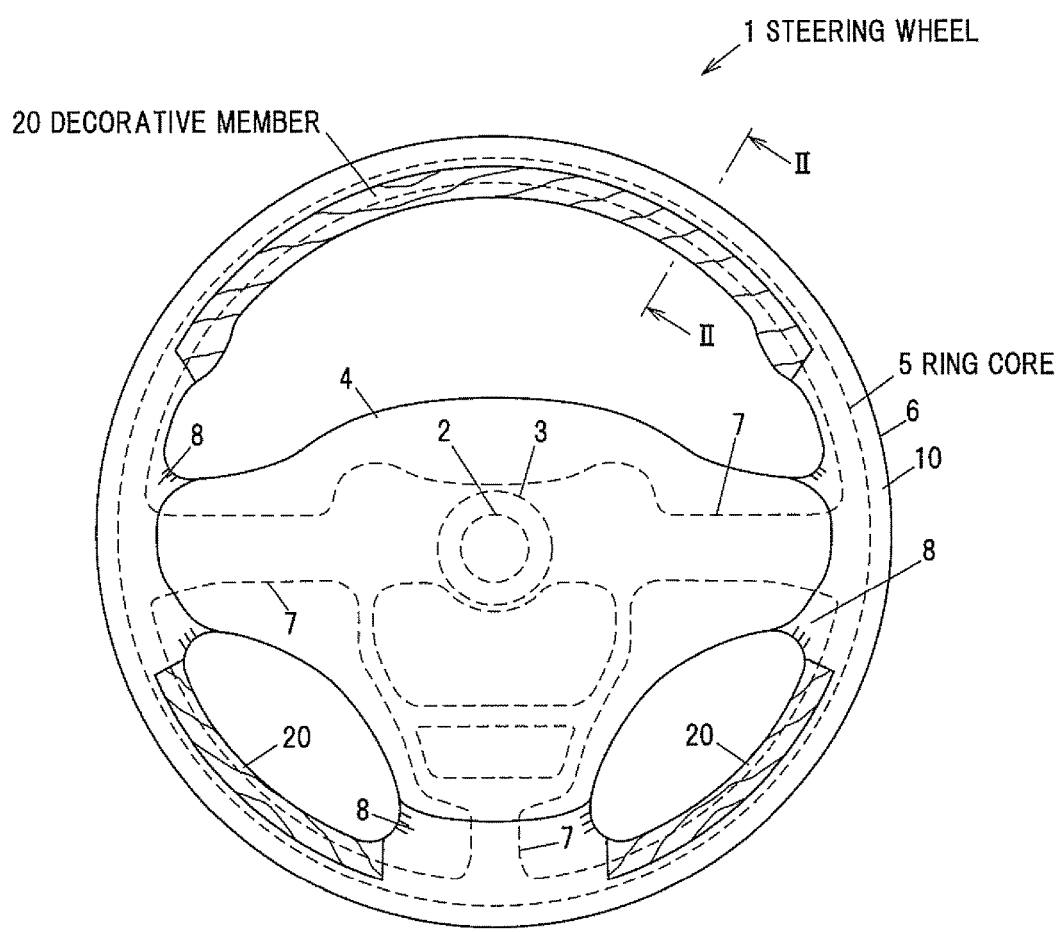
FIG. 1 is a schematic plan view illustrating an example of a steering wheel provided with a decorative member according to a preferred embodiment of the present invention.

In FIG. 1, a reference sign 1 indicating an overall configuration schematically indicates an automotive steering wheel provided with a typical decorative member 20 according to the present embodiment. Note that, in the description below, a front surface of the steering wheel 1 will also be referred to as a front portion, a back surface of the steering wheel 1 will also be referred to as a rear portion, and up, down, left, and right directions will be referred to as viewed from the front surface of the steering wheel 1.

The steering wheel 1 according to an example illustrated in the drawings includes a cylindrical boss portion 3 fitted and fixed to the leading end of a steering shaft 2, a pad portion 4 attached to an upper portion of the boss portion 3, a ring portion 6 that covers a ring core 5, and spoke portions 8 that partially cover three spoke cores 7 that connect the ring core 5 of the ring portion 6 with the boss portion 3.

Figure 2:
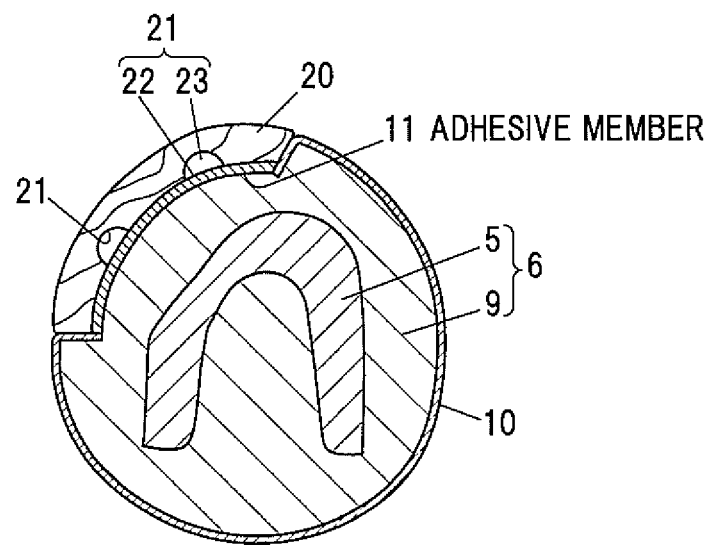
FIG. 2 is an enlarged cross-sectional view schematically illustrating main components of the steering wheel cut along a II-II line in FIG. 1.

As illustrated in FIG. 1 and FIG. 2, an outer circumferential portion of the ring portion 6 and outer circumferential portions of the spoke portions 8 are covered by a cover portion 9 made of a resin member, such as polyurethane. A skin portion 10 made of leather is attached to the surface of the cover portion 9. The decorative member 20 having a design surface that improves an outward appearance design of the steering wheel 1 is mounted on the surface of the cover portion 9.

Configuration of Decorative Member

Figure 3:
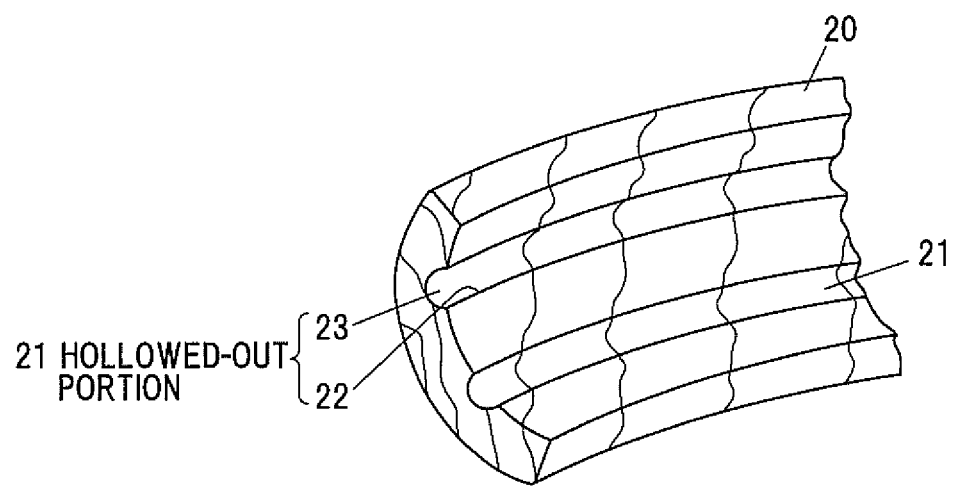
FIG. 3 is a partial schematic perspective view illustrating an example of the decorative member according to the embodiment.

As illustrated in FIG. 1, FIG. 2, and FIG. 3, the decorative member 20 according to the example illustrated in the drawings is configured by three members including the decorative member 20 positioned on the upper side of the ring portion 6, which is a grip portion gripped by a driver, the decorative member 20 positioned on the lower left side of the ring portion 6, and the decorative member 20 positioned on the lower right side of the ring portion 6. Although these decorative members 20 are mounted on the inner circumferential side of the ring portion 6 of the steering wheel 1, as illustrated in FIG. 1, a configuration can be adopted in which the decorative members 20 are mounted on the outer circumferential side of the ring portion 6.

Although the decorative member 20 positioned on the upper side of the ring portion 6 will be described below, the decorative members 20 positioned on the lower left side and on the lower right side of the ring portion 6 have the same shape and structure as the decorative member 20 positioned on the upper side thereof. Therefore, a detailed description of the decorative members 20 provided on the lower left side and on the lower right side of the ring portion 6 is omitted here.

The decorative member 20 is formed of a woodgrain material, which configures a design part, and is formed in a curved plate shape. The woodgrain material is extended and curved along an extending direction of the ring portion 6, and covers a substantially quadrant section of the surface of the ring portion 6 located on the side facing the driver. The back surface of the woodgrain material is fixed to the ring portion 6 by an adhesive member 11. Examples of a material for the woodgrain material include a walnut material, a maple material, a bamboo material, or the like.

When an impact load acts on the steering wheel 1 having the above-described configuration, since the decorative member 20 is fixed along an extending direction of the cover portion 9, which is made of a resin member such as polyurethane, deformation of the decorative member 20 does not easily follow deformation of the ring portion 6 or the spoke portion 8. Thus, a strain amount acting on the woodgrain material exceeds a limit strain amount, and in some cases, cracks occur in the decorative member 20.

Therefore, a rigidity reducing portion, which reduces torsional rigidity and bending rigidity, is formed in the decorative member 20 itself. This rigidity reducing portion is configured by hollowed-out portions 21 formed along an extending direction of the back surface, which faces the ring portion 6, of the decorative member 20. The hollowed-out portions 21 are configured as curved recessed grooves including openings 22 formed along the extending direction of the back surface, which faces the ring portion 6, of the decorative member 20, and cavities 23 in communication with the openings 22.

With this configuration, when the impact load acts on the steering wheel 1, in the decorative member 20 itself, the torsional deformation and the bending deformation are likely to occur around the hollowed-out portions 21, thus allowing the deformation of the decorative member 20 to follow the deformation of the steering wheel 1.

Modified Example of Decorative Member

To clearly demonstrate an effect of the steering wheel decorative member 20, a modified example illustrated below can also be used.

Figure 4:
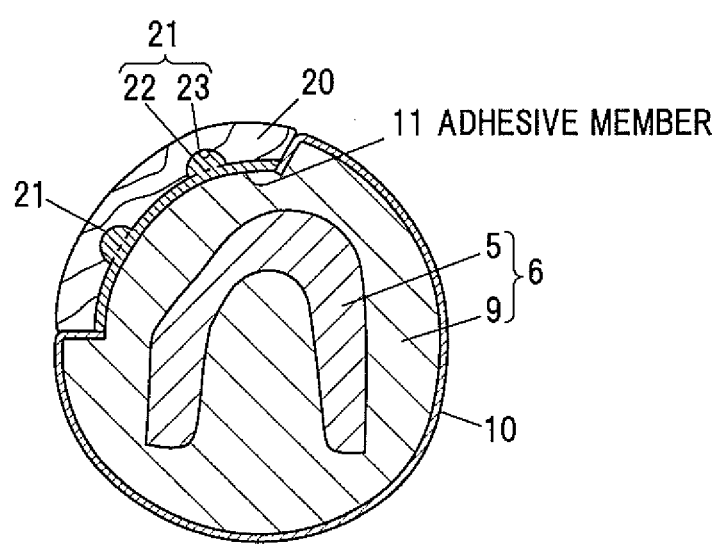
FIG. 4 is an enlarged cross-sectional view, corresponding to FIG. 2, illustrating main components of another example of the decorative member.

As illustrated in FIG. 4, a configuration can be adopted in which at least part of each of the cavities 23 of the hollowed-out portions 21 of the decorative member 20 is filled with a soft material softer than the material of the decorative member 20. The adhesive member 11, which bonds the decorative member 20 to the ring portion 6, is preferably used as the soft material. An epoxy-based adhesive or the like can be used as the adhesive member 11, for example.

The cross-sectional shape of each of the hollowed-out portions 21 is preferably a shape in which stress does not become concentrated, and can be a curved surface shape having an arc-shape, such as a circular shape and an oval shape, for example.

The example illustrated in the drawings illustrates an example in which two lines of the hollowed-out portions 21 are formed in the extending direction of the back surface, which faces the ring portion 6, of the decorative member 20. However, the number of the hollowed-out portions 21 is not limited to two lines, and one line, or three or more lines of the hollowed-out portions 21 can be formed as appropriate.

The strength of the decorative member 20 is determined by the material quality, the plate thickness, and the like. However, to configure the decorative member 20 such that the bending and torsional deformation easily occurs therein, it is effective to appropriately select the width, depth, cross-sectional form, arrangement position, and the like of the hollowed-out portions 21 of the decorative member 20. Effects According to the steering wheel decorative member 20 having the above-described configuration, the following effect can be achieved in addition to the above-described effects.

By forming the recessed grooves in the back surface of the decorative member 20, which is formed of the woodgrain material and has the curved plate shape, strain in the torsional direction of the woodgrain material can be reduced.

By forming the recessed grooves in the back surface of the decorative member 20, the bending deformation and the torsional deformation can occur easily, and the decorative member 20 can be prevented from breaking due to the bending and torsional load applied thereto when the steering wheel 1 is significantly deformed.

When the steering wheel 1 is significantly deformed, the decorative member 20 is not restricted and deforms so as to follow the deformation of the ring portion 6 or the spoke portion 8. Thus, the decorative member 20 and the steering wheel 1 can be caused to deform smoothly and flexibly. As a result, when the steering wheel 1 is deformed, the impact can be effectively absorbed.

Although the representative configuration example of the steering wheel decorative member 20 according to the present invention refers to a case in which the decorative member 20 is adopted in an automobile, the present invention is not limited thereto. The steering wheel decorative member 20 can of course be effectively adopted in various types of working vehicle, such as construction machinery and agricultural machinery.

As made clear by the description above, the invention according to the scope of the claims is not limited by the representative embodiment, the modified example, and the illustrated example of the present invention. As such, it should be understood that all combinations of the features described in the embodiment, the modified example, and the illustrated example are not required parts of the means to solve the problem of the invention.

What is claimed is:

1. A steering wheel decorative member, which is used for being attached to a resin member covering a periphery of a ring core of a steering wheel, comprising
    a hollowed-out portion comprising an opening that is formed on a surface of the decorative member facing the resin member and that extends in a longitudinal direction of the decorative member,
    wherein the hollowed-out portion comprises a cross section with no stress concentrated in a direction orthogonal to the longitudinal direction of the decorative member.
2. The steering wheel decorative member according to claim 1,
    wherein the hollowed-out portion comprises a groove formed in communication with the opening, and
    wherein at least part of the groove is filled with a softer material than the decorative member.
3. The steering wheel decorative member according to claim 2, wherein the soft material comprises an adhesive that bonds the decorative member to the resin member.
4. The steering wheel decorative member according to claim 1, wherein the hollowed-out portion comprises a curved surface having an arc-shape in cross section.
5. The steering wheel decorative member according to claim 1, wherein the decorative member further comprises a wood material.
6. The steering wheel decorative member according to claim 1, wherein the hollowed-out portion comprises a plurality of hollowed-out portions at a position symmetrical with respect to a center axis along the longitudinal direction of the decorative member.
7. The steering wheel decorative member according to claim 1,
    wherein the hollowed-out portion comprises a groove formed in communication with the opening, and
    wherein the groove is unfilled with any materials.
8. A steering wheel decorative member, which is used for being attached to a resin member covering a periphery of a ring core of a steering wheel, comprising
    a hollowed-out portion comprising an opening that is formed on a surface of the decorative member facing the resin member and that extends in a longitudinal direction of the decorative member,
    wherein the hollowed-out portion comprises a groove formed in communication with the opening, and
    wherein at least part of the groove is filled with a softer material than the decorative member.

* * * * *